Aug. 4, 1925.　　　　　　　　　　　　　　　　　　　1,548,349
P. A. F. CAYLA
HYDRAULIC BRAKE FOR VEHICLE WHEELS
Filed Feb. 1, 1923　　　2 Sheets-Sheet 1

Pierre Amédée Firmin
Cayla
INVENTOR:

his Attorney.

Aug. 4, 1925.
P. A. F. CAYLA
1,548,349
HYDRAULIC BRAKE FOR VEHICLE WHEELS
Filed Feb. 1, 1923      2 Sheets-Sheet 2
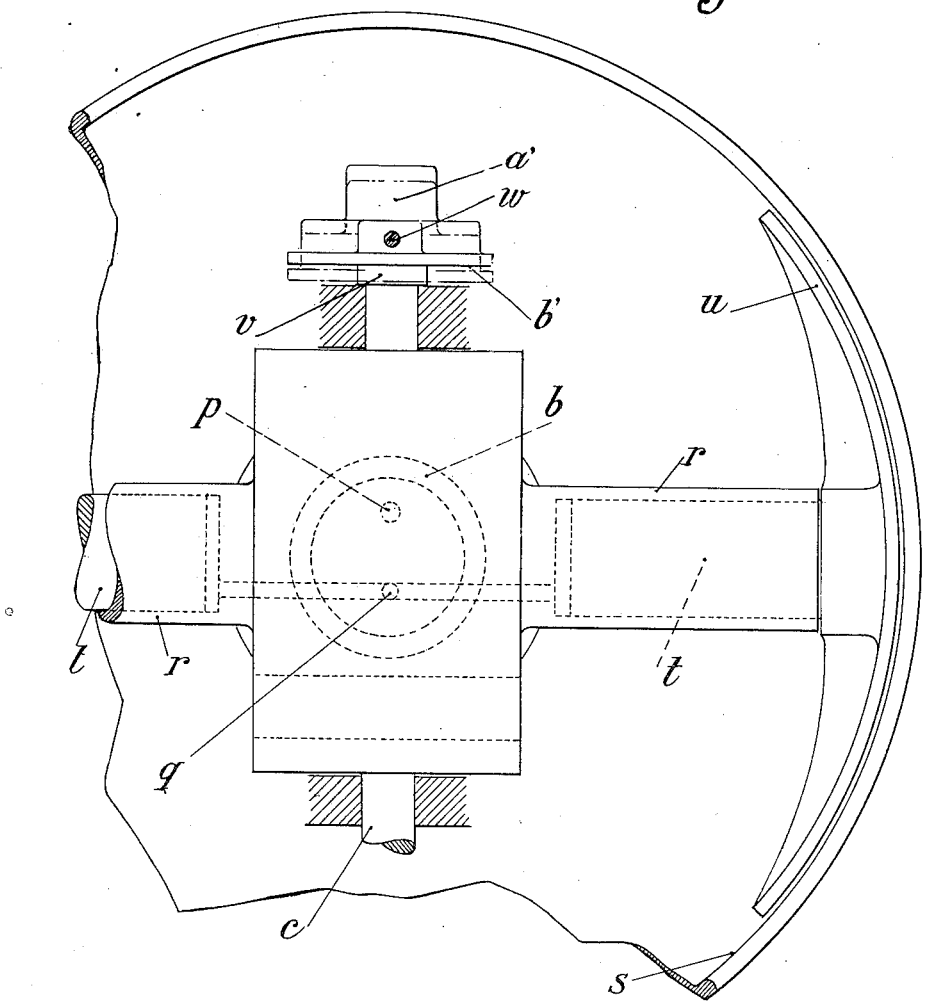
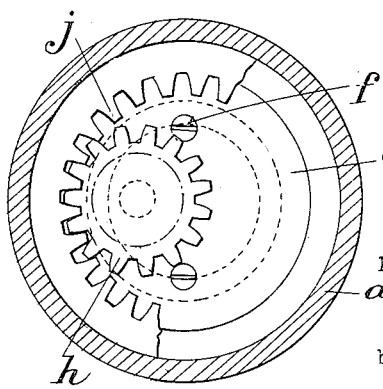
Pierre Amédée Firmin Cayla,
by *Otto Munk*
his Attorney.

Patented Aug. 4, 1925.

1,548,349

UNITED STATES PATENT OFFICE.

PIERRE AMÉDÉE FIRMIN CAYLA, OF PARIS, FRANCE, ASSIGNOR TO SOCIETE ANONYME DES AEROPLANES G. VOISIN, OF ISSY-LES-MOULINEAUX, FRANCE.

HYDRAULIC BRAKE FOR VEHICLE WHEELS.

Application filed February 1, 1923. Serial No. 616,253.

*To all whom it may concern:*

Be it known that I, PIERRE AMÉDÉE FIRMIN CAYLA, a citizen of the French Republic, residing at Paris, in the French Republic, have invented new and useful Improvements in Hydraulic Brakes for Vehicle Wheels, of which the following is a specification.

The present invention has for its object a hydraulic brake for vehicle wheels, and particularly for steering wheels of motor vehicles.

According to this invention, the brake shoes of each wheel are actuated by a liquid under pressure delivered by a pump which is carried by the axle-journal on which said wheel is mounted, and is driven directly by the wheel.

A further feature of this invention resides in that the delivery pipe of the pump is provided with a by-pass returning to the suction orifice of the pump and normally open; said by-pass may be closed by means of a valve operated by the driver in order to discharge the liquid into cylinders containing pistons which carry the shoes acting on the brake drum secured to the wheel.

It is thus observed that the braking energy is taken solely from the rotation of the wheel without the use of outside energy furnished by the driver, or by an element actuated by the engine. In this manner, the transmission devices using rod and link gear are eliminated, which affords a special application of the device according to this invention to the steering wheels of a motor vehicle. Moreover, the braking ceases at the same time as the rotation of the wheel, and therefore cannot occasion the blocking of the latter.

In the drawing which shows by way of example an embodiment of the invention as applied to a front wheel of a motor car:

Fig. 2 is a front view of the interior of the drum secured to the wheel, showing the brake shoes which act upon the said drum.

Fig. 3 is a section on the line 3—3 of Fig. 1, of the end of the hub and of the axle-journal.

Figure 1:
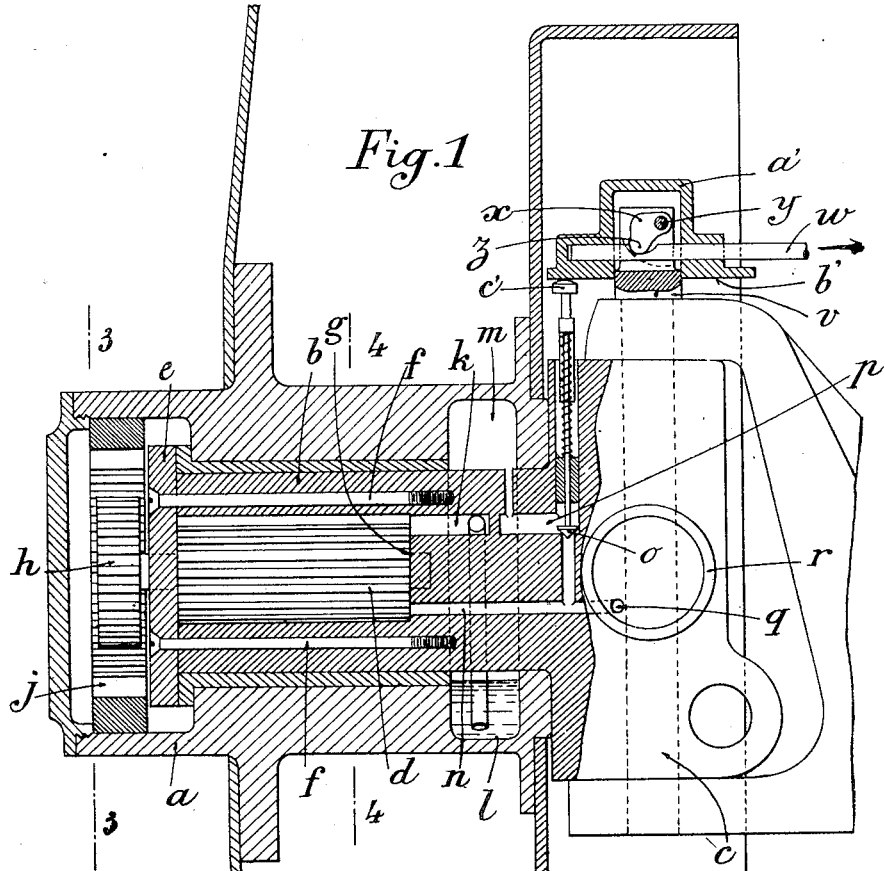
Fig. 1 is a vertical section of a front wheel through the steering swivel.
Figure 4:
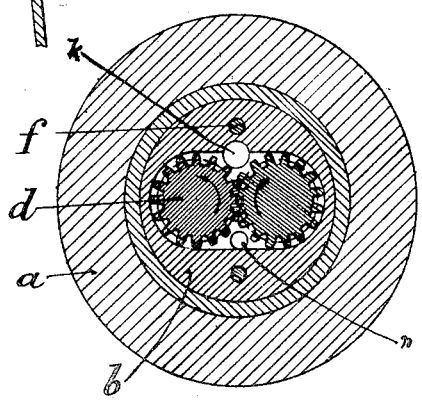
Fig. 4 is a section on the line 4—4 of Fig. 1 of the oil geared pump provided in the hub.

The steering wheel shown in the drawing is provided with a hub $a$ mounted upon the axle-journal $b$; the latter is connected to the front axle by means of the usual steering swivel $c$.

A wide central bore is provided in the axle-journal and is adapted to contain an oil geared pump $d$. The bore or cylindrical chamber formed in the axle-journal is closed by the plate $e$ which is secured by the screw rods $f$ to the bottom $g$ of the cylindrical chamber.

The axis of one of the pinions of this pump $d$ extends through the plate $e$ and carries a gear wheel $h$ which engages a geared crown $j$ disposed within the outer end of the hub $a$.

The oil reservoir is formed by an annular chamber $m$ in the hub $a$, and the oil sucked by the pump out of the lower part 1 of said reservoir through the pipe $k$ is discharged through the pipe $n$, and then, according to the position of the valve $o$, the oil may follow two different paths. When the valve $o$ is lifted, the oil flows through the pipe $p$ back to the reservoir $m$ from which it is again withdrawn. When this valve $o$ is closed, the oil flows through the piping $q$ to the diametrically opposite cylinders $r$, which are placed within the brake drum $s$ secured to the wheel.

Two pistons $t$ are adapted to move within the cylinders $r$ and carry the brake shoes $u$ which may bear upon the cylindrical flange of the drum $s$, whereby the braking is effected.

The valve $o$ is controlled by a device which is not to be affected by the movements of the steering wheel. To this end, the steering swivel $c$ connecting the axle-journal $b$ to the front axle of the vehicle has a head $v$ wherein is formed a slot through which an axle or rod $w$, secured to the control cable, may slide; a triangular piece or cam $x$ movable about an axle $y$ secured to the head $v$ is also mounted in said slot and the operative projection $z$ of said cam is engaged in a slot in the rod $w$.

The operation of the braking device is as follows: in normal operation, the hub $a$ rotating about the axle-journal $b$ drives, through the intermediary of the ring $j$ and the pinion $h$, the geared pump $d$. Oil or any other fluid is thus withdrawn from the lower part $l$ of the annular chamber $m$, and is discharged through the pipe $n$, the valve $o$ being lifted off its seat, and is directly returned to the suction orifice of the pump through the conduit $p$; the oil in this case does not exert any action upon the pistons $t$ of the cylinders $r$, and hence the shoes $u$ are not moved.

When braking is desired, the driver acts upon a lever or like device placed within reach of the driver, and this action, through the medium of cables or like simple transmission devices, not shown in the drawing, causes the rod $w$ to be drawn in the direction of the arrow. The rod $w$, when moving, draws the projection $z$ of the cam $x$ which now pivots about the axis $y$. But since the head $v$ secured to the steering swivel $c$ is stationary, this rocking motion of the cam $x$ lowers the rod $w$ and consequently lowers also a cap $a'$ adapted to slide on said head $v$ and through which the rod $w$ may also slide. (In Fig. 2 the lower position of the cap $a'$ is shown in dotted lines). The cap $a'$ is provided with a circular flange $b'$ which is caused to bear upon the head of a knob $c'$ secured at the upper end of the stem of the valve $o$. The cap $a'$ being lowered, this valve therefore fits upon its seat and cuts off the communication between the conduits $q$ and $p$.

The oil which is further discharged by the pump is then delivered under pressure into the conduit $n$, but as the valve $o$ is closed, the oil proceeds through the conduits $q$ into the cylinders $r$, and acts upon the pistons $t$ which are secured to the brake shoes $u$; the latter are thus pressed against the drum $s$ and produce the braking.

In the movements of the steering wheel, the flange $b'$ of the cap $a'$ is always in contact with the top of the button $c'$ but does not actuate the valve $o$ as long as the brake control device is not actuated.

It is observed that with the device according to the invention, no rod and link control device is required. The controls are here considerably simplified and are intended to provide for the movements of the rod $w$ which requires but a neglible effort; on the other hand, the relative movements of the wheels and the vehicle frame have no more influence on the braking, whilst in the brakes with usual mechanical control, the connection between the brake segments secured to the wheel and the control element attached to the vehicle frame is a serious problem.

It must be observed also that according to this invention, the pressure in the piping, and hence in the brakes, will fall when the wheel ceases to rotate, so that the wheels cannot be wholly blocked, which is a considerable advantage in road operation.

Having now described my invention, what I claim as new and desire to secure by Letters Patent is:

1. In a hydraulic braking device for vehicle wheels the combination with an axle-journal having a discharge passage therein, a wheel hub mounted on said axle-journal and having a liquid reservoir therein, a brake drum secured to said hub, brake shoes inside said drum, a pump actuated by said wheel hub and adapted to suck liquid out of said reservoir, said pump being located within said axle-journal and being normally short-circuited and means actuated by the driver and adapted to cause the liquid discharged by the pump to press the brake shoes against the drum.

2. In a hydraulic braking device for vehicle wheels the combination with an axle-journal having a discharge passage therein, of a wheel hub mounted on said axle-journal, a brake drum secured to said hub, said hub having an annular recess therein, brake shoes inside said drum, an inner annular recess in said hub, a geared pump located within said axle-journal and actuated by said wheel hub, said pump being adapted to suck liquid out of said recess said discharge passage being normally short circuited, a normally open valve in said discharge passage and means actuated by the driver for closing said valve and causing the liquid discharged by the pump to press the brake shoes against the drum.

3. In a hydraulic braking device for vehicle wheels the combination with an axle-journal having a discharge passage therein, of a wheel hub mounted on said axle-journal, a brake drum secured to said hub said hub having an annular recess therein, brake cylinders inside said drum, pistons adapted to move within said cylinders and carrying brake shoes, a geared pump located within said axle-journal and actuated by said wheel hub, said pump being adapted to suck liquid out of said recess, and to discharge said liquid through said discharge passage connecting said pump to said cylinders, a by-pass connecting said discharge passage back to said recess, a normally open valve in said by-pass and means actuated by the driver for closing said valve.

4. In a hydraulic braking device for vehicle wheels the combination with an axle-journal having a discharge passage therein, of a wheel hub mounted on said axle-journal, a brake drum secured to said hub said hub having an annular recess therein, brake cylinders inside said drum, pistons adapted to move within said cylinders and carrying brake shoes, a geared pump located within said axle-journal, a driving pinion for said pump, a toothed crown carried by said hub and meshing with said driving pinion, said pump being adapted to suck liquid out of said recess, and to discharge said liquid through said discharge passage connecting said pump to said cylinders, a by-pass connecting said discharge passage back to said recess, a normally open valve in said by-pass and means actuated by the driver for closing said valve.

5. In a hydraulic braking device for vehicle wheels the combination with a steering swivel, of an axle-journal carried by the said steering-swivel, and having a discharge passage therein a wheel hub mounted on said axle-journal, a brake drum secured to said hub, said hub having an annular recess therein, brake shoes inside said drum, a geared pump located within said axle-journal and actuated by said wheel hub, said pump being adapted to suck liquid out of said recess said discharge passage being normally short circuited, a normally open valve in said discharge passage and means carried by said steering swivel and actuated by the driver for closing said valve and causing the liquid discharged by the pump to press the brake shoes against the drum.

6. In a hydraulic braking device for vehicle wheels the combination with a steering swivel, of an axle-journal carried by the said steering-swivel, and having a discharge passage therein a wheel hub mounted on said axle-journal, a brake drum secured to said hub said hub having an annular recess therein, brake shoes inside said drum, a geared pump located within said axle-journal and actuated by said wheel hub, said pump being adapted to suck liquid out of said recess said discharge passage being normally short circuited, a normally open valve in said discharge passage, said valve being provided with a stem adapted to slide within a bore of said steering swivel a cap adapted to slide on one end of said steering swivel and bearing on the outer end of said valve stem, a cam pivoting on said steering swivel and adapted to act on said cap for closing said valve, and means actuated by the driver for operating said cam.

7. In a hydraulic braking device for vehicle wheels the combination with a steering swivel, of an axle-journal carried by the said steering-swivel, and having a discharge passage therein a wheel hub mounted on said axle journal, a brake drum secured to said hub said hub having an annular recess therein, brake shoes inside said drum, a geared pump located within said axle journal and actuated by said wheel hub, said pump being adapted to suck liquid out of said recess said discharge passage being normally short circuited, a normally open valve in said discharge passage, said valve being provided with a stem adapted to slide within a bore of said steering swivel, a cap adapted to slide on one end of said steering swivel and bearing on the outer end of said valve stem, a control rod guided through said cap, and a cam pivoting on said steering swivel, the operative projection of said cam engaging in a notch provided in said control rod.

In testimony whereof I have signed my name to this specification.

PIERRE AMÉDÉE FIRMIN CAYLA.